United States Patent [19]

Fieni

[11] 3,901,345
[45] Aug. 26, 1975

[54] INSTALLATION FOR INCREASING THE SAFETY OF THE OCCUPANTS OF AN AUTOMOBILE VEHICLE

[75] Inventor: Walter Fieni, Paris, France

[73] Assignee: Societe Anonyme Francaise du Ferodo, Paris, France

[22] Filed: May 21, 1973

[21] Appl. No.: 362,042

[30] Foreign Application Priority Data
May 23, 1972 France .............................. 72.18286

[52] U.S. Cl. ............................. 180/91; 280/150 SB
[51] Int. Cl.² ..................................... B60R 21/10
[58] Field of Search ...... 280/150 SB, 150 B; 180/91

[56] References Cited
UNITED STATES PATENTS
2,873,122  2/1959  Peras ................... 180/91
3,220,747  11/1965  Marion ................ 280/150 SB
3,484,134  12/1969  Townsend ........... 280/150 SB Primary Examiner—Robert R. Song
Attorney, Agent, or Firm—Haseltine, Lake & Waters

[57] ABSTRACT

An installation for protecting a vehicle occupant maintained on his seat by a restraining belt in the event of an impact, comprising a shock damper on said vehicle and means for varying the damping conditions of the shock damper as a function of a factor representing the tension of said belt.

3 Claims, 4 Drawing Figures

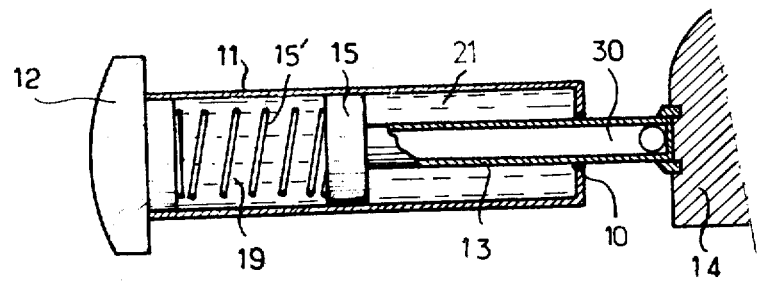
FIG. 1
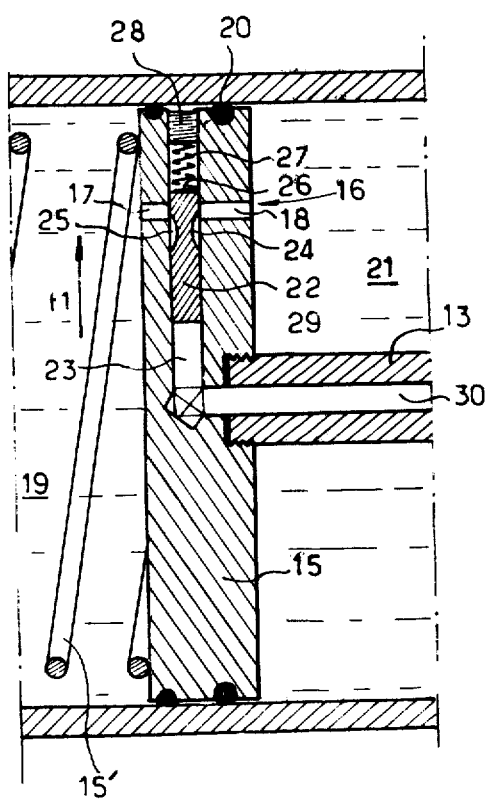
FIG. 2
FIG. 3

INSTALLATION FOR INCREASING THE SAFETY OF THE OCCUPANTS OF AN AUTOMOBILE VEHICLE

The present invention relates to an installation for increasing the safety of the occupants of an automobile vehicle.

It is known that, for their safety, the occupants of an automobile vehicle are maintained on their seat by a belt the extremities of which are anchored, directly or indirectly, to the body of the vehicle.

The present invention is based on the fact that the deformation of the vehicle, particularly its front portion, in a collision, may contribute to partially absorb the momentum of the occupant and, hence, to decrease the stresses to which the latter is subjected by the belt when this deformation takes place while the belt is strongly stressed by the occupant: this contribution increases moreover in proportion to the stress.

The invention consists in providing an automobile vehicle, in its most frequently exposed part or parts, most often at the front, with a shock absorber whose degree of absorption varies as a function of the taughtness of the belt, so that the stiffness of the shock absorber becomes low when the tightness of the belt reaches a predetermined value.

It has already been proposed to provide a vehicle with a shock absorber designed for becoming operative for impacts occurring when the vehicle is travelling at a low speed and which thus contributes to the occupants' safety. The invention provides for arranging this shock absorber in order that it will take effect additionally in an equally satisfactory manner in the variable shock absorption conditions defined above as a function of the taughtness of the belt during a collision whatever the velocity of the vehicle is at the moment of the impact.

The invention can be applied with any type of shock absorber: rupture, plastic strain, hydraulic throtling.

The present invention thus enables the occupants to be more efficiently protected than with known safety belt means.

The invention provides for means associated with the belts and which, as a function of the taughtness of the latter, bring about variable shock absorption conditions in the shock absorber.

It contemplates an embodiment whereby said means contribute at least partially to absorb the occupant's momentum and thus further increase the efficiency of the protection. An installation according to this form of embodiment is particularly advantageous when the shock absorber is a hydraulic absorber.

The invention also contemplates an embodiment wherein a rigid member integral with the bumper is mechanically locked with respect to the body of the vehicle as long as the tensile stress remains below said value and is released when said value is reached, its displacement being subsequently controlled by a deformable structure in accordance with a selected deformation law.

The following description given by way of example refers to the attached drawings wherein:

FIG. 1 is a diagram of a portion of an installation according to the invention;

FIG. 2 is a larger scale part view thereof;

FIG. 3 is a view of another portion of the installation;

Figure 4:
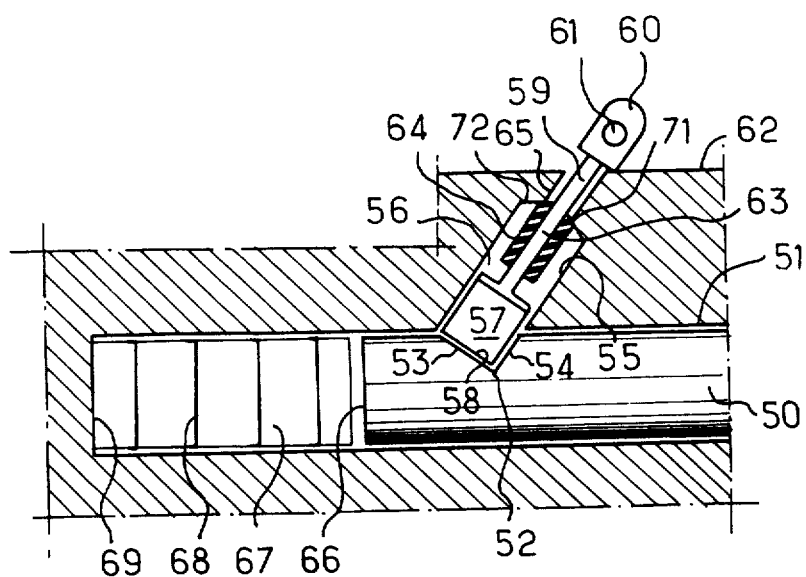
FIG. 4 is a cross section of another embodiment.

A cylinder 11 (FIG. 1) of a shock absorber is integral with a fender 12 or bumper bar, and is slidably mounted on a piston 15 the front face of which is biased by a spring 15', and carried on the extremity of a piston rod 13. Piston rod 13 is integral with the body 14 of the automobile vehicle. The sealing relationship between the piston 15 which is surrounded by liquid, and cylinder 11, is ensured by packings 20 (FIG. 2). The sealing relationship between piston rod 13 and cylinder 11 is ensured by a packing 10.

Piston 15 is crossed by a longitudinal channel 16 comprising two portions 17 and 18, the first of which emerges in the front chamber 19 of the cylinder and the second in the rear chamber 21.

Communication between portions 17 and 18 of channel 16 is by means of a gate valve 22 slidably mounted in a radial bore 23 of piston 15 possessing a constriction 24, delimited by a revolution surface with a curvilinear generating line defining, together with bore 23, an annular recess 25.

On one of its faces 26, the gate valve 22 is biased by a spring 27 which bears, on the other hand, against a plug 28 blocking bore 23. The opposite face 29 of gate valve 22 is subjected to the pressure prevailing in a duct 30 bored in piston rod 13, said rod being threaded onto piston 15.

At its other extremity, duct 30 communicates through a pipe 32 with chamber 33 (FIG. 3) of a hydraulically controlled device 34, with a calibrated valve 35 being interposed. Device 34 is of the type having a cylinder 36 and a piston 37, which defines chamber 33 containing a hydraulic fluid of the same type as the hydraulic fluid in chambers 19 and 21. The bottom 43 of device 34 comprises an orifice 38 for junction to an anchor point in the body of the vehicle and rod 39 of piston 37, comprising a shoulder 31, sealingly passes through the other end 40 and is attached by a coupling means 42 to a strap 41 forming part of a safety belt device comprised by the vehicle interior.

Under normal conditions, gate valve 22 is in the position shown in FIG. 2, i.e. its constriction 24 is only partially opposite the outlets of portions 17 and 18 of channel 16. The shock absorber absorbs any eventual impact sustained at the front of the vehicle by throtling the liquid passing from chamber 19 to chamber 21 by portion 17 of bore 16, the annular recess 25 and portion 18, the damping that it provides being comparable to that of a shock absorber used solely for protection with respect to weak impacts. The damping provided increases in proportion to the degree of impact, which is the characteristic of any hydraulic shock absorber functioning on the principle of throtling.

If the impact sustained by the vehicle is such that the occupant fitted with the safety belt device to which the hydraulically controlled device 34 is associated, is thrown forwards, — and for an impact of such intensity, a conventional shock absorber with the same characteristics would be nonoperative owing to the excessive stiffness for this impact, — piston 37 of control device 34 is biased in the direction of arrow $f$ and compresses the fluid within chamber 33; when the pressure in chamber 33 reaches a predetermined value, valve 35 opens and there is a pressure increase transmitted through pipe 32, in duct 30; gate valve 22 is displaced in the direction of arrow $f_1$, bringing the entire annular recess 25 in front of the outlets of portions 17 and 18 of passage 16. The stiffness of the hydraulic damper is thus decreased during the phase in which the passenger's chest is restrained through the absorption of kinetic energy by the strap of the belt to which control device 34 is connected.

The fact that the deformation of the front portion of the vehicle is made more difficult simultaneously with the forward travel of the occupant's chest, while the straps are considerably taughtened, places the occupant in the most favourable conditions with respect to its protection from the consequences of the impact. Indeed, this deformation results in a displacement of the anchor points of the belt at which are applied the reactions forces developed at the anchoring points, work being produced, in the mechanical sense of the term, hence leading to an energy consumption decreasing the forces applied to the user's chest owing to the pressures exerted by the strap.

In an alternative embodiment, the damping depends upon several users's belts.

Reference is now made to FIG. 4. A member 50, in the form of a bar or cylinder, is slidably mounted in a longitudinal housing 51 of the body of the vehicle. Member 50 is extended forwards by the fender placed at the front of the vehicle (right-hand portion of the Figure) and comprises a notch 52 with a plane face 53 and a cylinder surface 54. The latter extends the cylindrical surface 55 of a cavity 56 of the body of the vehicle which serves to house a piston 57 whose end 58 co-operates with plane face 53 of notch 52 and on the opposite face of which is fixed the piston rod 59. The latter ends in a yoke 60 with an eye 61 projecting in relation to the upper face 62 of the floor to attach a strap forming part of the safety belt device, portion 63 of the rod 59 normally housed in cavity 55 being integral with a peripheral sleeve 64, of elastomer material, whose outside diameter is greater than the diameter of passageway 75 connecting cavity 55 with the interior of the vehicle. Behind the rear face 66 of member 50 is located, in housing 51, a structure 57 which can be deformed, for example, by crushing according to a suitable law as a function of displacement, this device being diagrammatically represented by compartments 68 bearing against the bottom 69 of said housing.

The operation is as follows:

Under normal conditions, yoke 60 performs the function of a conventional anchoring point for the safety belt, and is restrained by the abutment of front face 71 of sleeve 64 against the connecting shoulder 72 between cavity 56 and passageway 65. In the event of the front of the vehicle entering into collision, the fender or shock absorber which is extended by mechanical part 50, performs its usual function as long as said part 50 is immobilized by the abutment of its face 54 against piston 57, this being when the impact is relatively weak or of average intensity.

In the event of violent impact, when the occupant's body maintained by the safety belt is projected forwards at a relative velocity such that the belt risks to injure him owing to the intensity of the reaction forces that it exerts upon his chest, the traction applied by the belt to yoke 60 is sufficient for sleeve 64 integral with rod 59 to be introduced by force into passageway 65, and piston 57, which locked part 50, is released from notch 52. Part 50, which forms part of the fender, can then move to the rear, crushing the deformable structure 67. The stiffness of the vehicle is thereby decreased, which results in a forward displacement in space of the anchoring points of the belt or other restraining device, thus increasing the work of the pressure forces applied by the sections or straps of the safety belt to the occupant's bust and which are, moreover, advantageously limited. Hence, the maximum of energy is consumed.

Thus the weak impacts (city traffic) are absorbed without damage but the strong shocks are directly communicated to member 50 without loss of stroke.

I claim:

1. An installation for protecting a vehicle occupant maintained on his seat by a restraining belt in the event of an impact, comprising a shock damper mounted on said vehicle, said shock damper forming a part of the vehicle structure; and means for varying the damping conditions of the shock damper as a function of a factor representing the tension of said belt, means contributing to absorption of the impact, said means being immobilized as long as the tension of the restraining belt does not exceed a predetermined value; a sliding member being connected to and projecting from the shock damper; an anchoring device of the belt for locking said sliding member into position; said sliding member having a notch therein, an immobilization member engageable in said notch and being formed integral with a yoke anchoring device for the restraining belt and adapted to be separated from the notch upon crushing of an elastic material in said immobilization member.

2. An installation according to claim 1, said sliding member upon release thereof displaced as a result of an impact with crushing of a deformable structure in said shock absorber having a calibrated deformation strength.

3. An installation for protecting a vehicle occupant maintained on his seat by a restraining belt in the event of an impact, comprising a shock damper mounted on said vehicle, said shock damper forming a part of the vehicle structure; a bumper bar of said vehicle being mounted on said shock damper; and means for varying the damping conditions of the shock damper as a function of a factor representing the tension of said belt.

* * * * *